United States Patent [19]
Rydelek et al.

[11] Patent Number: 6,112,026
[45] Date of Patent: Aug. 29, 2000

[54] ONE-TIME-USE CAMERA IN WHICH LENS REMOVED WITH COVER PART DURING CAMERA DISASSEMBLY

[75] Inventors: James G. Rydelek, Henrietta; Kevin J. O'Leary, Rochester, both of N.Y.

[73] Assignee: Eastman Kodak Company, Rochester, N.Y.

[21] Appl. No.: 09/316,857

[22] Filed: May 21, 1999

[51] Int. Cl.⁷ .................................................... G03B 17/02
[52] U.S. Cl. ................................ 396/6; 396/373; 396/535
[58] Field of Search ............................... 396/6, 373, 529, 396/535, 541; 359/811, 819

[56] References Cited

U.S. PATENT DOCUMENTS

| | | |
|---|---|---|
| 2,936,685 | 5/1960 | O'Brien et al. . |
| 4,100,555 | 7/1978 | Johnson . |
| 5,157,430 | 10/1992 | Ogawa . |
| 5,400,098 | 3/1995 | Rydelek . |
| 5,436,685 | 7/1995 | Yamashina . |
| 5,543,876 | 8/1996 | Suzuki et al. . |
| 5,555,062 | 9/1996 | Pearson et al. . |
| 5,608,486 | 3/1997 | Takagi et al. . |
| 5,623,702 | 4/1997 | Pearson . |
| 5,768,649 | 6/1998 | Pearson . |
| 5,815,738 | 9/1998 | Petruchik . |

*Primary Examiner*—Alan A. Mathews
*Attorney, Agent, or Firm*—Roger A. Fields

[57] ABSTRACT

A one-time-use camera capable of being disassembled and comprising a main body part, a lens secured releasably to the main body part to permit the lens to be released from the main body part during camera disassembly, and a cover part separable from the main body part during camera disassembly, is characterized in that the lens is connected with the cover part to cause the lens to be released from the main body part when the cover part is separated from the main body part during camera disassembly. This facilitates camera disassembly.

7 Claims, 6 Drawing Sheets

ONE-TIME-USE CAMERA IN WHICH LENS REMOVED WITH COVER PART DURING CAMERA DISASSEMBLY

FIELD OF THE INVENTION

The invention relates generally to the field of photography, and in articular to one-time-use cameras. More specifically, the invention relates to a ne-time-use camera in which at least one of its lenses is automatically removed ith one of its cover parts during camera disassembly.

BACKGROUND OF THE INVENTION

Film and cameras that are all in one, commonly referred to as single-use or one-time-use cameras, have become well known. The one-time-use camera is a simple point-and-shoot type comprising an opaque plastic main body part that supports a conventional film cartridge in a cartridge receiving chamber, an unexposed film roll prewound from the film cartridge onto a film supply spool in a film supply chamber, a fixed-focus taking lens, a film metering mechanism with a rotatably supported metering sprocket that engages the filmstrip, a manually rotatable film winding thumbwheel rotatably engaged with a film take-up spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film take-up spool inside the film cartridge. This winds an exposed frame of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the latent images and make prints for the customer.

It is the practice that the entire camera is disassembled, in order that at least some of the used camera parts may be recycled, i.e. reused.

SUMMARY OF THE INVENTION

According to one aspect of the invention, a one-time-use camera capable of being disassembled and comprising a main body part, a lens secured releasably to the main body part to permit the lens to be released from the main body part during camera disassembly, and a cover part separable from the main body part during camera disassembly, is characterized in that:

the lens is connected with the cover part to cause the lens to be released from the main body part when the cover part is separated from the main body part during camera disassembly. This facilitates camera disassembly.

According to another aspect of the invention, a method of disassembling a one-time-use camera including a lens secured releasably to a main body part to permit the lens to be released from the main body part during camera disassembly, and a cover part separable from the main body part during camera disassembly, comprises the steps:

separating the cover part from the main body part; and maintaining a connection between the cover part and the lens when the cover part is separated from the main body part to cause the lens to be released from the main body part.

DETAILED DESCRIPTION OF THE INVENTION

Figure 1:
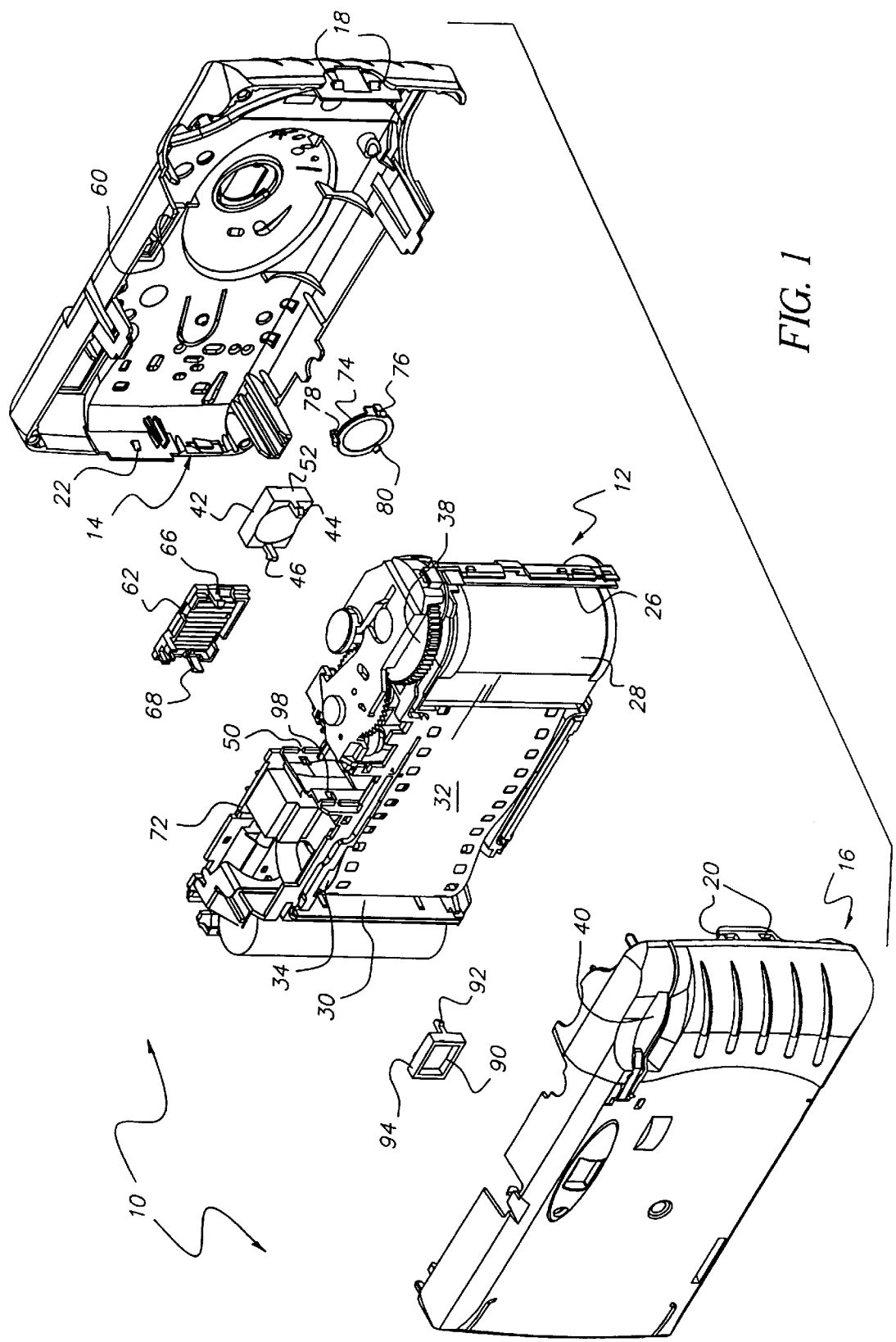
FIG. 1 is an exploded rear perspective view of a one-time-use camera which is a preferred embodiment of the invention, showing front and rear viewfinder lenses, a taking lens, a flash cover lens, and front and rear cover parts exploded from a main body part.
Figure 2:
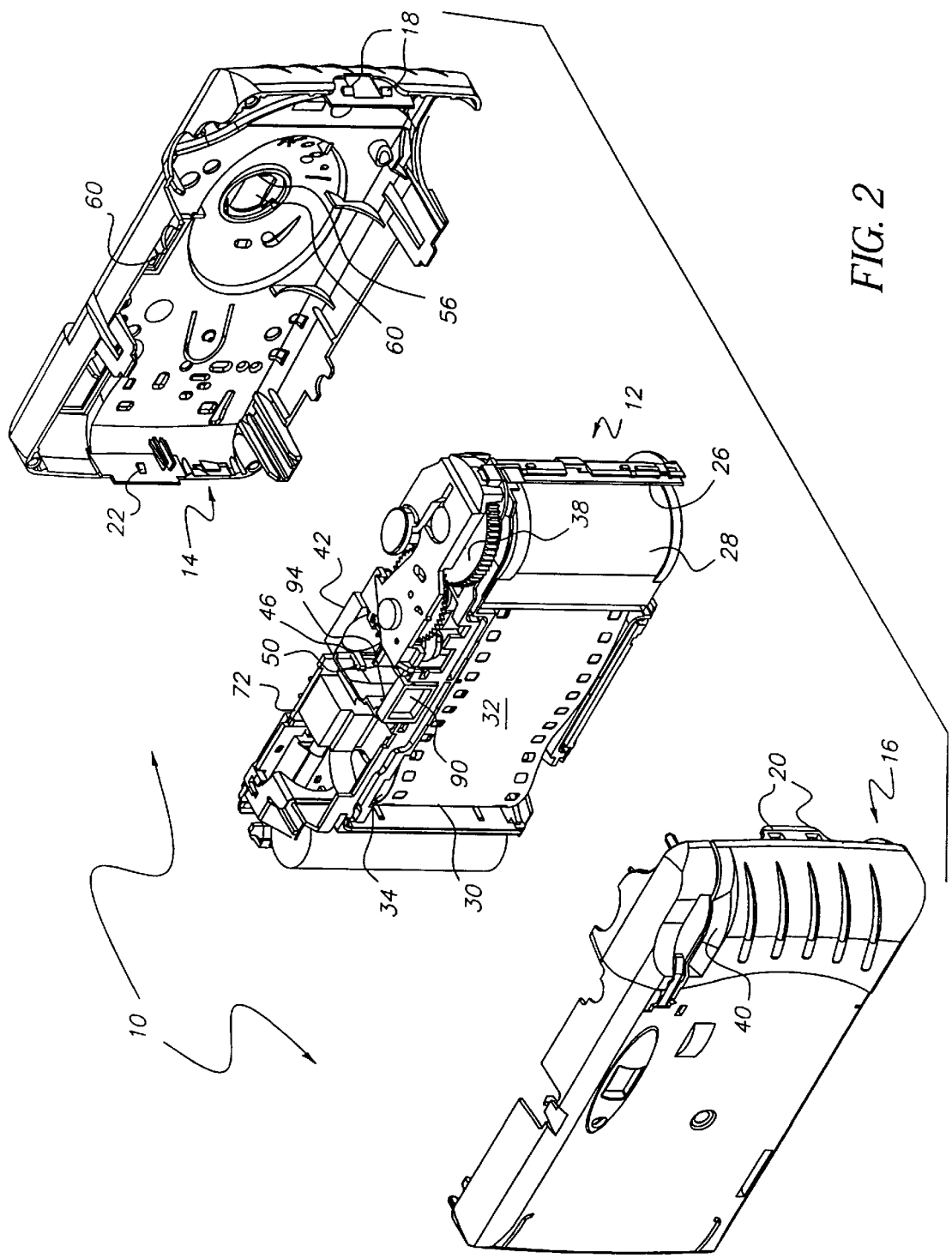
FIG. 2 is an exploded rear perspective view similar to FIG. 1, showing the viewfinder lenses, the taking lens and the flash cover lens connected to the main body part.
Figure 3:
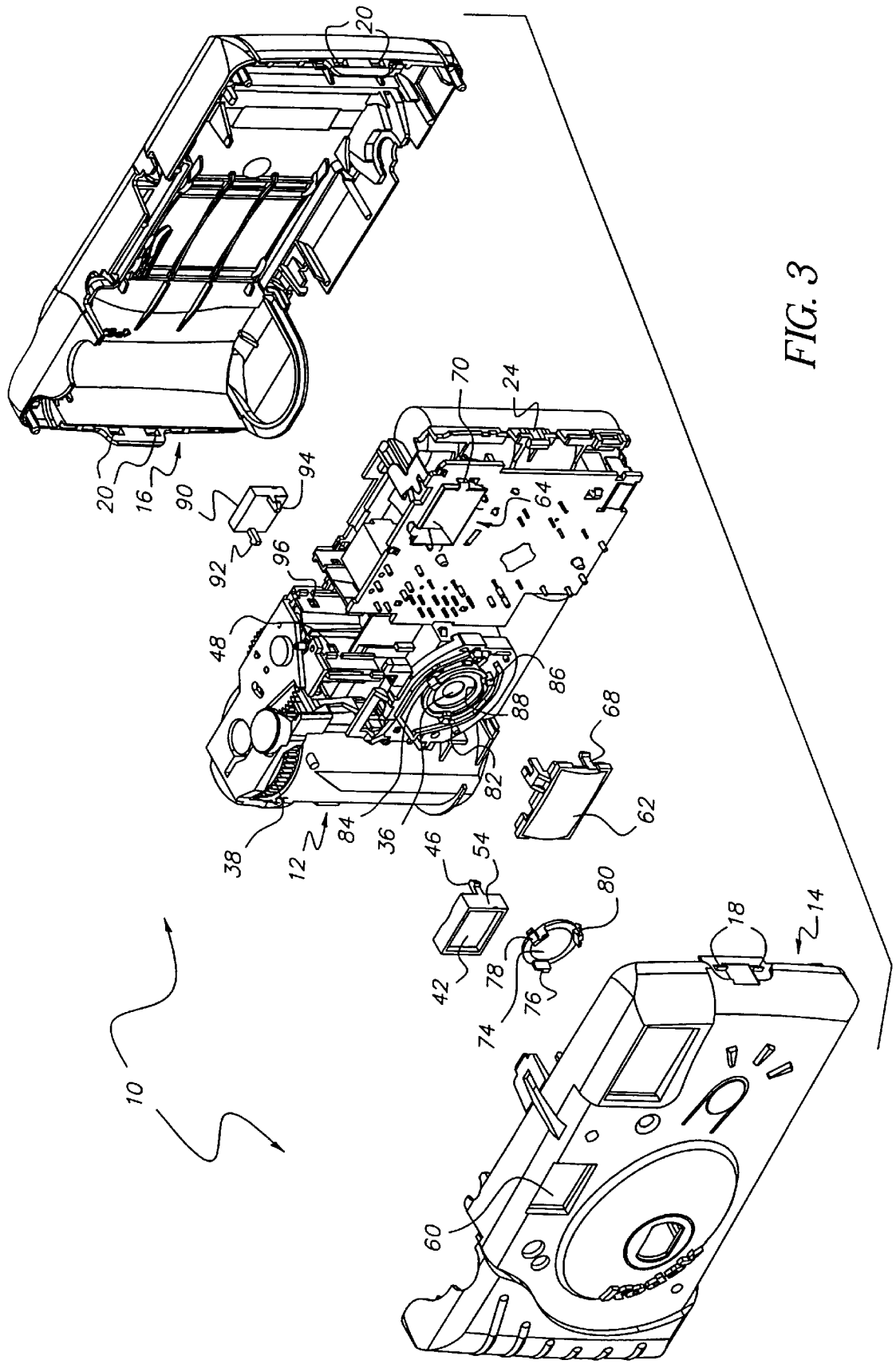
FIG. 3 is an exploded front perspective view of the one-time-use camera, showing the viewfinder lenses, the taking lens, the flash cover lens, and the front and rear cover parts exploded from the main body part.
Figure 4:
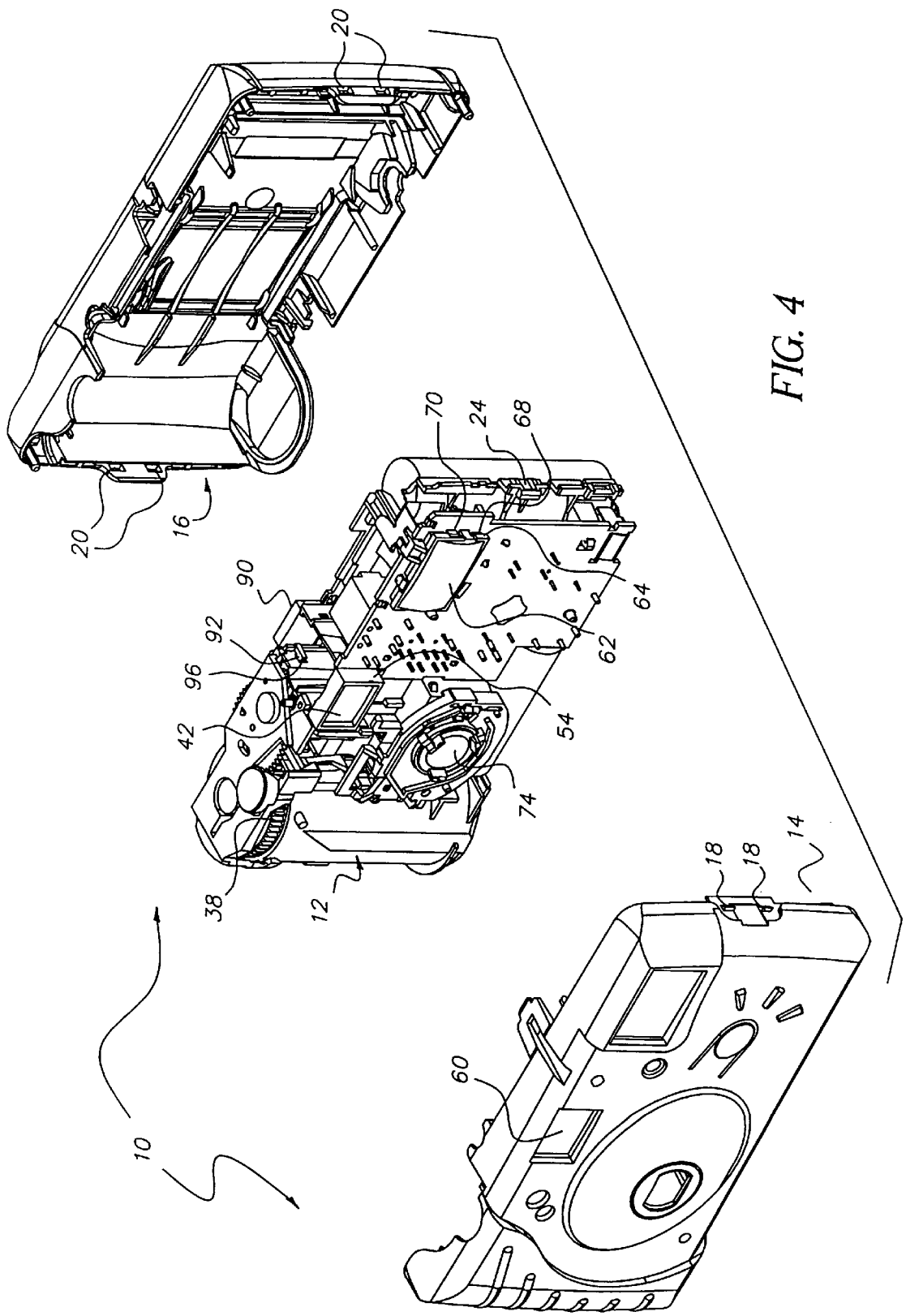
FIG. 4 is an exploded front perspective view similar to FIG. 3, showing the viewfinder lenses, the taking lens and the flash cover lens connected to the main body part.
Figure 5:
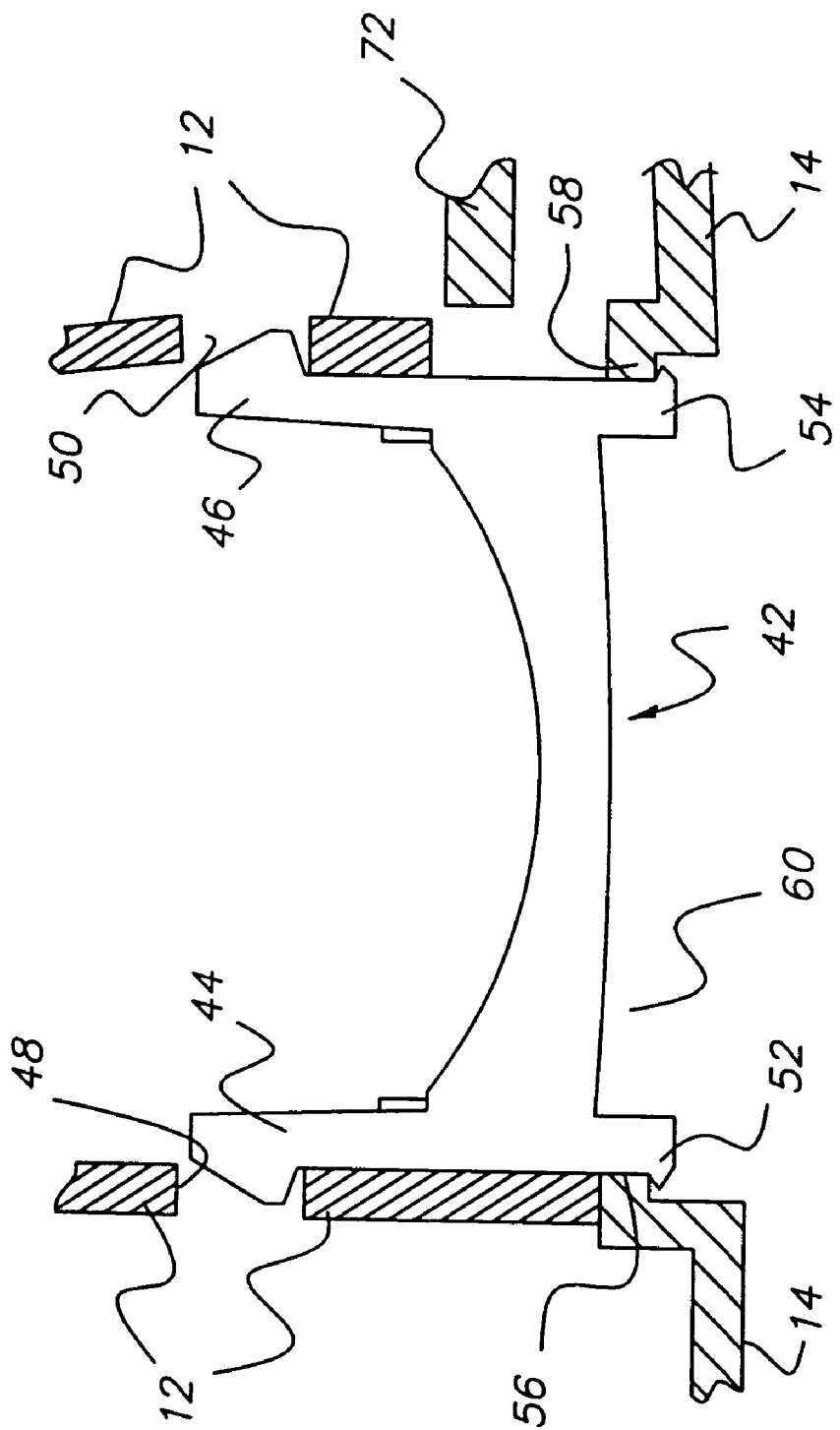
FIG. 5 is top partial-sectional of the front viewfinder lens connected to the main body part and the front cover part.

The invention is disclosed as being embodied preferably in a onetime-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–6 show a one-time-use camera 10. The one-time-use camera 10 includes a plastic opaque main body part 12, a plastic opaque front cover part 14, and a plastic opaque rear cover part 16. The front cover part 14 and the rear cover part 16 house the main body part 12 between them and are connected releasably to one another via two pairs of end hooks 18, 18, 18, 18 on the front cover part and corresponding pairs of mating end holes 20, 20, 20, 20 in the rear cover part. See FIGS. 1 and 3. The front cover part 14 is connected releasably to the main body part 12 via two end hooks 22 (only one shown) on the front cover part and corresponding mating end cavities 24 (only one shown) in the main body part. See FIGS. 1 and 3. The respective connections releasably between the front and rear cover parts 14 and 16, and releasably between the front cover part and the main body part 12, are known connections.

The main body part 12 has a rearwardly open cartridge receiving chamber 26 for a conventional 35mm film cartridge 28 and a rearwardly open film supply chamber 30 that contains a rotatably supported film supply spool (not shown). See FIG. 1. During manufacture, a filmstrip 32 is prewound from the film cartridge 28 into an unexposed film roll 34 on the film supply spool. A rearwardly open backframe opening (not shown) is located between the cartridge receiving chamber 26 and the film supply chamber 30 for exposing successive frames of the filmstrip 32 when ambient light is received through a front aperture 36 in the main body part 12. See FIG. 3.

A film winding thumbwheel 38, rotatably supported on the main body part 12, protrudes outwardly from a slot 40 in the rear cover part 16 and has a depending coaxial stem (not shown) in coaxial engagement with an exposed top end (not shown) of a film take-up spool inside the film cartridge 28. See FIG. 1. Manual winding rotation of the film winding thumbwheel 38, counter-clockwise in FIG. 1, similarly rotates the film take-up spool inside the film cartridge 28 to wind each exposed frame of the filmstrip 32 into the film cartridge and to move a fresh frame of the filmstrip from the unexposed film roll 34 on the film supply spool to the backframe opening.

A front viewfinder lens 42 has a first set of flexible hook-shaped projections (snap-hooks) 44 and 46 that are received in corresponding mating holes 48 and 50 in the main body part 12 to engage (interlock) the front viewfinder lens releasably with the main body part. See FIGS. 1–5. The front view finder lens 42 has a second set of rigid hook-shaped projections 52 and 54 that engage corresponding complementarily-shaped projections 56 and 58 on the front cover part 14. See FIG. 5. The complementarily-shaped projections 56 and 58 are at a lens opening 60 for the front viewfinder lens 42 in the front cover part 14. The first set of hook-shaped projections 44 and 46 extend parallel to the second set of hook-shaped projections 52 and 54 and are longer than the first set of hook-shaped projections. The terms "parallel" and "longer" refer to extension of the first and second sets of hook-shaped projections 44 and 46 and 58 and 58 horizontally in FIG. 5.

A flash cover lens 62 for a known electronic flash 64 on the main body part 12 has a set of flexible hook-shaped projections (snap-hooks) 66 and 68 that are received in corresponding mating holes 70 (only one shown) in a flash circuit board 72 to engage (interlock) the flash cover lens releasably with the flash circuit board. See FIGS. 1–4.

A taking lens 76 has a set of rigid radial projections 76, 78 and 80 that engage releasably with corresponding mating projections 82, 84 and 86 within a nest 88 on the main body part 12.

A rear viewfinder lens 90 has a set of flexible hook-shaped projections (snap-hooks) 94 and 96 that are received in corresponding mating holes 94 and 96 in the main body part 12 to engage (interlock) the rear viewfinder lens releasably with the main body part. See FIGS. 1–4.

When the maximum number of exposures available on the filmstrip 32 have been made, and the filmstrip is completely wound into the film cartridge 28, the one-time-use camera 10 must be opened to remove the film cartridge with the exposed filmstrip from the cartridge receiving chamber 26. Then, the one-time-use camera 10 is disassembled to recycle at least some of the camera parts.

Figure 6:
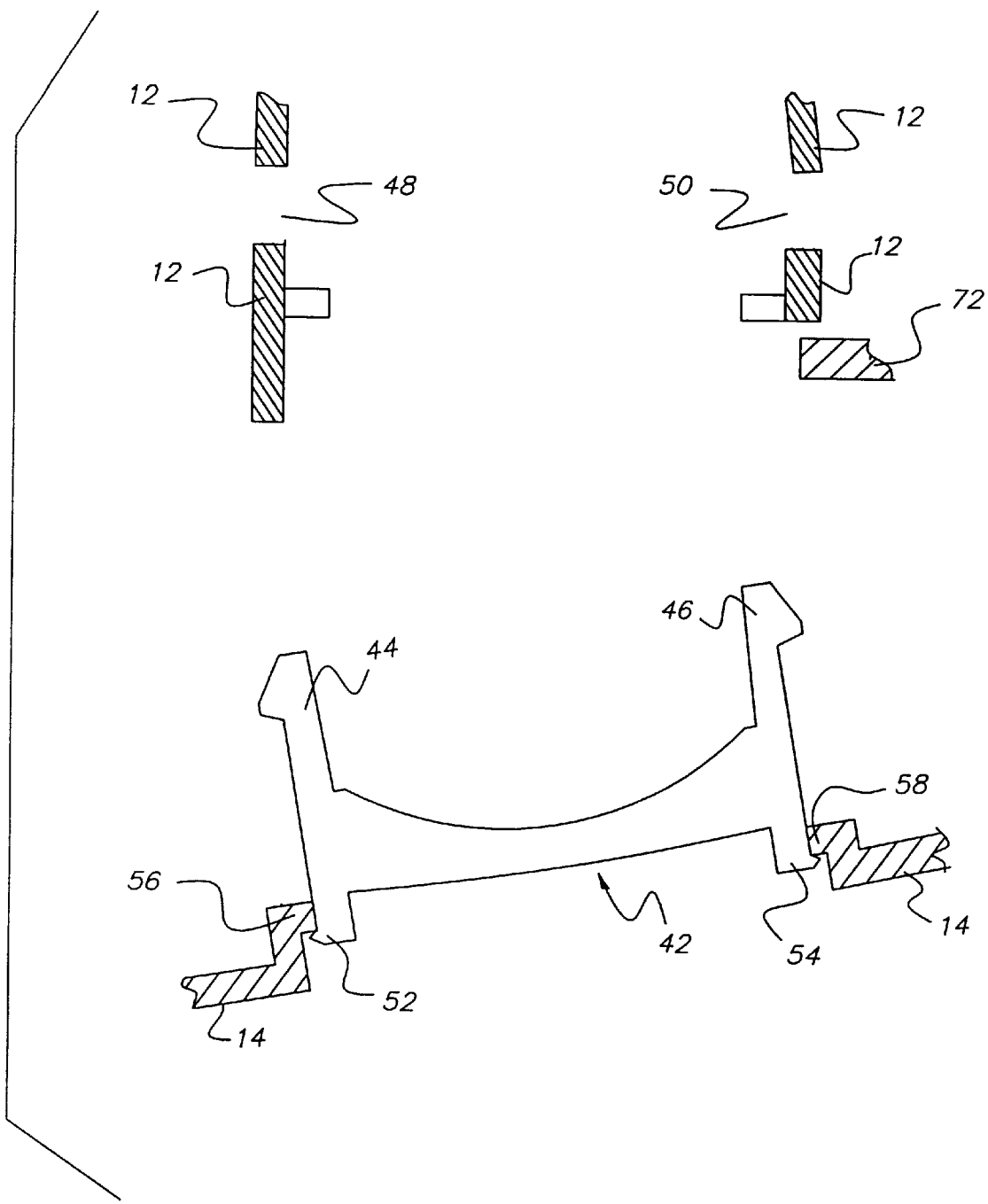
FIG. 6 is top partial-section view similar to FIG. 5, showing the front viewfinder lens disconnected from the main body part when the front cover part is separated from the main body part during camera disassembly.

A method of disassembling the one-time-use camera 10 includes the following steps. Disconnecting the two pairs of end hooks 18, 18, 18, 18 on the front cover part 14 from the respective pairs of end holes 20, 20, 20, 20 in the rear cover part 16, and disconnecting the two end hooks 22 (only one shown) on the front cover part from the respective end cavities 24 (only one shown) in the main body part 12. Separating (pulling away) the front cover part 14 from the main body part 12 as shown in FIG. 6. When the front cover part 14 is pulled away from the main body part 12 as shown in FIG. 6, the first set of flexible hook-shaped projections (snap-hooks) 44 and 46 on the front viewfinder lens 42 are automatically pulled out of the respective mating holes 48 and 50 in the main body part 12, owing to the remaining connection of the rigid hook-shaped projections 52 and 54 on the front viewfinder lens with the complementarily-shaped projections 56 and 58 on the front cover part. Thus, the front viewfinder lens 42 is automatically released from the main body part 12 when the front cover part 14 is separated from the main body part as shown in FIG. 6.

The invention has been described with reference to a preferred embodiment. However, it will be appreciated that variations and modifications can be effected by a person of ordinary skill in the art without departing from the scope of the invention. For example, in addition to (or alternatively in place of) disconnecting the front viewfinder lens 42 from the main body part 12 when the front cover part 14 is pulled away from the main body part as shown in FIG. 6, the flash cover lens 62 and/or the taking lens 74 can be connected to the front cover part similar to the way the front viewfinder lens is connected to the front cover part, in order to disconnect the flash cover lens from the flash circuit board 72 and/or to disconnect the taking lens from the main body part when the front cover part is pulled away from the main body part. Also, the rear viewfinder lens 90 can connected to the rear cover part 16 similar to the way the front viewfinder lens 42 is connected to the front cover part 14, in order to disconnect the rear viewfinder lens from the main body part 12 when the rear cover part is separated from the main body part.

PARTS LIST 10. one-time-use camera
12. main body part
14. front cover part
16. rear cover part
18. end hooks
20. mating end holes
22. end hooks
24. mating end cavities
26. cartridge receiving chamber
28. film cartridge
30. film supply chamber
32. filmstrip
34. unexposed film roll
36. front aperture
38. film winding thumbwheel
40. slot
42. front viewfinder lens
44. hook-shaped projection
46. hook-shaped projection
48. mating hole
50. mating hole 52. hook-sha ped projection
54. hook-shaped projection
56. complementarily-shaped projection
58. complementarily-shaped projection
60. lens opening
62. flash cover lens
64. electronic flash
66. hook-shaped projection
68. hook-shaped projection
70. mating holes
72. flash circuit board
74. taking lens
76. radial projection
78. radial projection
80. radial projection
82. mating projection
84. mating projection
86. mating projection
88. nest
90. rear viewfinder lens
92. hook-shaped projection
94. hook-shaped projection
96. mating hole
98. mating hole

What is claimed is:

1. A one-time-use camera capable of being disassembled and comprising a main body part, a lens secured releasably to said main body part to permit said lens to be released from said main body part during camera disassembly, and a cover part separable from said main body part during camera disassembly, is characterized in that:

said lens is connected with said cover part to effect a connection between said lens and said cover part which is maintained when said cover part is separated from said main body part during camera disassembly, to cause said lens to be released from said main body part.

2. A one-time-use camera capable of being disassembled and comprising a main body part, a lens secured releasably to said main body part to permit said lens to be released from said main body part during camera disassembly, and a cover part separable from said main body part during camera disassembly, is characterized in that:

said lens has a first set of projections that engage said main body part to secure said lens releasably to said main body part and a second set of projections that connect with said cover part to cause said first set of projections to be disengaged from said main body part when said cover part is separated from said main body part.

3. A one-time-use camera as recited in claim 2, wherein said first set of projections are flexible, and said second set of projections are rigid.

4. A one-time-use camera as recited in claim 3, wherein said first set of projections are longer than said second set of projections.

5. A one-time-use camera as recited in claim 4, wherein said first set of projections and said second set of projections are each hook-shaped.

6. A one-time-use camera as recited in claim 5, wherein said first set of projections and said second set of projections extend parallel to one another.

7. A method of disassembling a one-time-use camera including a lens secured releasably to a main body part to permit the lens to be released from the main body part during camera disassembly, and a cover part separable from the main body part during camera disassembly, said method comprising the steps:

separating the cover part from the main body part; and maintaining a connection between the cover part and the lens when the cover part is separated from the main body part to cause the lens to be released from the main body part.

* * * * *